US011997248B2

(12) United States Patent
Abraham (10) Patent No.: US 11,997,248 B2
(45) Date of Patent: *May 28, 2024

(54) FIBER-OPTIC 3D IMAGING

(71) Applicant: Yoed Abraham, Givat-Shmuel (IL)

(72) Inventor: Yoed Abraham, Givat-Shmuel (IL)

( * ) Notice: Subject to any disclaimer, the term of this patent is extended or adjusted under 35 U.S.C. 154(b) by 0 days.

This patent is subject to a terminal disclaimer.

(21) Appl. No.: 17/516,697

(22) Filed: Nov. 2, 2021

(65) Prior Publication Data

US 2022/0201266 A1   Jun. 23, 2022

Related U.S. Application Data

(63) Continuation-in-part of application No. 17/126,120, filed on Dec. 18, 2020, now Pat. No. 11,162,783.

(51) Int. Cl.
*H04N 13/207* (2018.01)
*G02B 6/42* (2006.01)
*H04N 13/254* (2018.01)

(52) U.S. Cl.
CPC ......... *H04N 13/207* (2018.05); *G02B 6/4206* (2013.01); *H04N 13/254* (2018.05)

(58) Field of Classification Search
CPC ........ G02B 6/06; G02B 6/08; G02B 6/02085; G02B 6/02095; G02B 6/02142; G02B 6/02395; G02B 6/3885; G02B 6/403; G02B 6/4434; G02B 6/448; G02B 23/2469; G02B 21/0032; G02B 21/0052; G02B 21/361; G02B 21/367; G02B 23/04; G02B 26/103
USPC .......................................................... 348/46
See application file for complete search history.

(56) References Cited

U.S. PATENT DOCUMENTS

| 7,242,468 | B1 | 7/2007 | Zhang |
| 9,995,624 | B2 | 6/2018 | Morino et al. |
| 10,175,421 | B2 | 1/2019 | Tasker et al. |
| 10,264,954 | B2 | 4/2019 | Lamarque et al. |
| 2005/0128196 | A1 | 6/2005 | Popescu et al. |
| 2007/0154153 | A1* | 7/2007 | Fomitchov ............... G02B 6/06 385/115 |
| 2010/0265498 | A1* | 10/2010 | Zhang ................... G01J 3/0221 250/459.1 |
| 2013/0024029 | A1 | 1/2013 | Tran et al. |
| 2014/0268093 | A1 | 9/2014 | Tohme et al. |
| 2016/0018593 | A1* | 1/2016 | Tasker ................... G02B 6/448 385/37 |

(Continued)

FOREIGN PATENT DOCUMENTS

FR    2950441 A1    3/2011

OTHER PUBLICATIONS

Flusberg et al. (2005). Fiber-optic fluorescence imaging. *Nature methods*, 2(12), 941-950.

*Primary Examiner* — Masum Billah
(74) *Attorney, Agent, or Firm* — Brooks Kushman P.C.

(57) ABSTRACT

A fiber-optic, three-dimensional imager using focal length of fiber optic units as a discriminative feature to identify surface geometries of a target area based on reflection intensity of reflected illumination. The focal length defined in accordance with lens power, lens proximity to an optic fiber, chromatic lens aberration, or illumination wavelength. Captured reflections are directed to a light sensor and form an areal intensity distribution on the sensor that is rendered into a topographical model of the general target surface using a construction algorithm.

9 Claims, 11 Drawing Sheets

(56) References Cited

U.S. PATENT DOCUMENTS

| 2016/0041334 | A1 |   | 2/2016 | Suijver et al. |
| 2017/0139131 | A1 |   | 5/2017 | Karafin et al. |
| 2017/0276544 | A1 | * | 9/2017 | Gastaldo .............. G01B 11/022 |

* cited by examiner

Sample Position at the Lens Focal Length

Sample Position at the Lens Focal Length

FIBER-OPTIC 3D IMAGING

CROSS-REFERENCE TO RELATED APPLICATIONS

This application is a continuation-in-part of U.S. application Ser. No. 17/126,120 filed Dec. 18, 2020, now U.S. Pat. No. 11,162,783, the disclosure of which is hereby incorporated in its entirety by reference herein.

BACKGROUND OF THE INVENTION

There are multiple methods for obtaining three-dimensional (3D) information of objects. Typically, objects are scanned and the scan data is then resolved into a topographical model using a scanning device making use of principles such as confocal microscopy, structured Light, stereovision & time of flight, or moving a target object in front of a sensing system.

These methods are usually divided into two types: contact and non-contact 3D scanners.

Contact 3D scanners contact the target surface to capture the 3D scan data. They require a relatively long scan time compared to non-contact methods and also risk the danger of damaging the target object.

Non-contact 3D scanners usually use laser or structured light to illuminate the target object and capture reflectance that is then processed to generate a 3D model. Non-contact scanners are quicker than contact scanners and cannot damage the target object. However, non-contact scanners lack the precision of contact scanners.

Non-contact scanners also suffer from a variety of shortcoming depending on the technology employed. For example, confocal based scanners are relatively large thereby rendering scanning of large objects into a cumbersome process. The scanner bulkiness also impedes scanning of difficult to access surfaces.

Structured light-based scanners suffer from optical aberrations of the projector that can cause degradation of performance in time. Additionally, such scanners are typically bulky also rendering the usage cumbersome.

Stereovision based scanners require relevant movement of the target object which in certain settings is not practical or is inconvenient.

Therefore, there is a need for a compact an accurate 3D imager functional while stationary.

SUMMARY OF THE INVENTION

According to the teachings of the present invention there is provided a fiber-optic imager including one or more illuminators operative to direct illumination toward target areas of a target surface; and an array of collector optic fibers, each fiber of the array configured to capture the illumination reflected from one of the target areas within an acceptance cone within a full acceptance angle of each of the fibers so as to form an areal distribution in the array among fibers collecting the illumination reflected and fibers not collecting the illumination, the areal distribution corresponding to a collective surface geometry of the target areas.

According to a further feature of the present invention, the illuminators are implemented as light emitting diodes (LEDs).

According to a further feature of the present invention, each of the LEDs is in communication an illuminator fiber optic.

According to a further feature of the present invention, the LEDs are implemented as LED sensors.

According to a further feature of the present invention, each of the collector optic fibers is in communication with a light sensor.

According to a further feature of the present invention, the light sensor is implemented as a LED light sensor.

According to a further feature of the present invention, two or more of the LEDs are operative to emit illumination of different wave lengths.

According to a further feature of the present invention, wherein two or more of the collector optic fibers are implemented with differing numerical apertures.

According to a further feature of the present invention, two or more of the collector optic fibers are disposed at different receiving angles relative to a line normal to the target surface.

According to a further feature of the present invention, there is also provided a spacer operative to contact a surface of the target surface so as to define a distance between the target surface and the collector optic fibers.

According to a further feature of the present invention, there is also provided a processor in communications with the light sensor, the processor configured to construct a three-dimensional model of the target surface in accordance with captured reflectance by the collector optic fibers.

There is also provided according to the teachings of the present invention, a method for constructing a visual three-dimensional model of a target surface, the method including: directing illumination toward target areas of a target surface; and capturing the illumination reflected in an array of collector optic fibers, each fiber of the array configured to capture the illumination reflected from one of the target areas within an acceptance cone at an angle within an acceptance angle of each of the fibers so as to form an areal distribution in the array among fibers collecting the illumination reflected and fibers not collecting the illumination, the areal distribution corresponding to a collective surface geometry of the target areas.

According to the teachings of the present invention there is provided the illumination includes illumination of different wavelengths.

According to the teachings of the present invention there is provided the directing illumination toward target areas of a target surface is implemented as periodic illumination.

According to a further feature of the present invention, there is also provided, directing illumination from the array of collector optic fibers toward target areas of the target surface synchronously with the periodic illumination.

According to a further feature of the present invention, there is also provided, adjusting a collection angle of the array of collector optic fibers, the collection angle measured between an axis of the collector optic fibers and a line normal to the target surface.

According to a further feature of the present invention, there is also provided, constructing a three-dimensional model of the target surface in accordance with the areal distribution in the array among fibers collecting the illumination reflected and fibers not collecting the illumination.

BRIEF DESCRIPTION OF THE DRAWINGS

The subject matter regarded as the invention is particularly pointed out and distinctly claimed in the concluding portion of the specification. The invention is best understood in view of the accompanying drawings in which:

It will be appreciated that for the sake of clarity, elements shown in the figures may not be drawn to scale and reference numerals may be repeated in different figures to indicate corresponding or analogous elements.

DETAILED DESCRIPTION OF THE PRESENT INVENTION

In the following detailed description, specific details are set forth in order to facilitate understanding of the invention; however, it should be understood by those skilled in the art that the present invention may be practiced without these specific details.

Unless otherwise defined herein, scientific and technical terms used in connection with the present application shall have the meanings commonly understood by those of ordinary skill in the art.

Moreover, there is no intention to be bound by any expressed or implied theory presented in the preceding technical field, background, brief summary or the following detailed description.

Furthermore, well-known methods, procedures, and components have been omitted to highlight the invention. Reference numbers repeated among figures indicate identical or functionally similar elements.

Embodiments of the present invention are directed, inter alia, to a fiber-optic, three-dimensional imager leveraging the acceptance cone of each fiber optic in an illumination collector array to identify surface geometries of a target area based on reflection angles. The resulting areal distribution on a sensor is then rendered into a topographical model of the general target surface using a construction algorithm of the general target known to those skilled in the art.

The fiber-optic 3D imager represents an advance in the field of 3D imaging in that it is compact and capable of generating 3D topographical models in the absence of device scanning. The imager has application in a large variety of applications. Applications include medical endoscopy, brain surgery, dental, epidemic and other medical imaging, 3D printing, pipe examination, chip testing.

Figure 1:
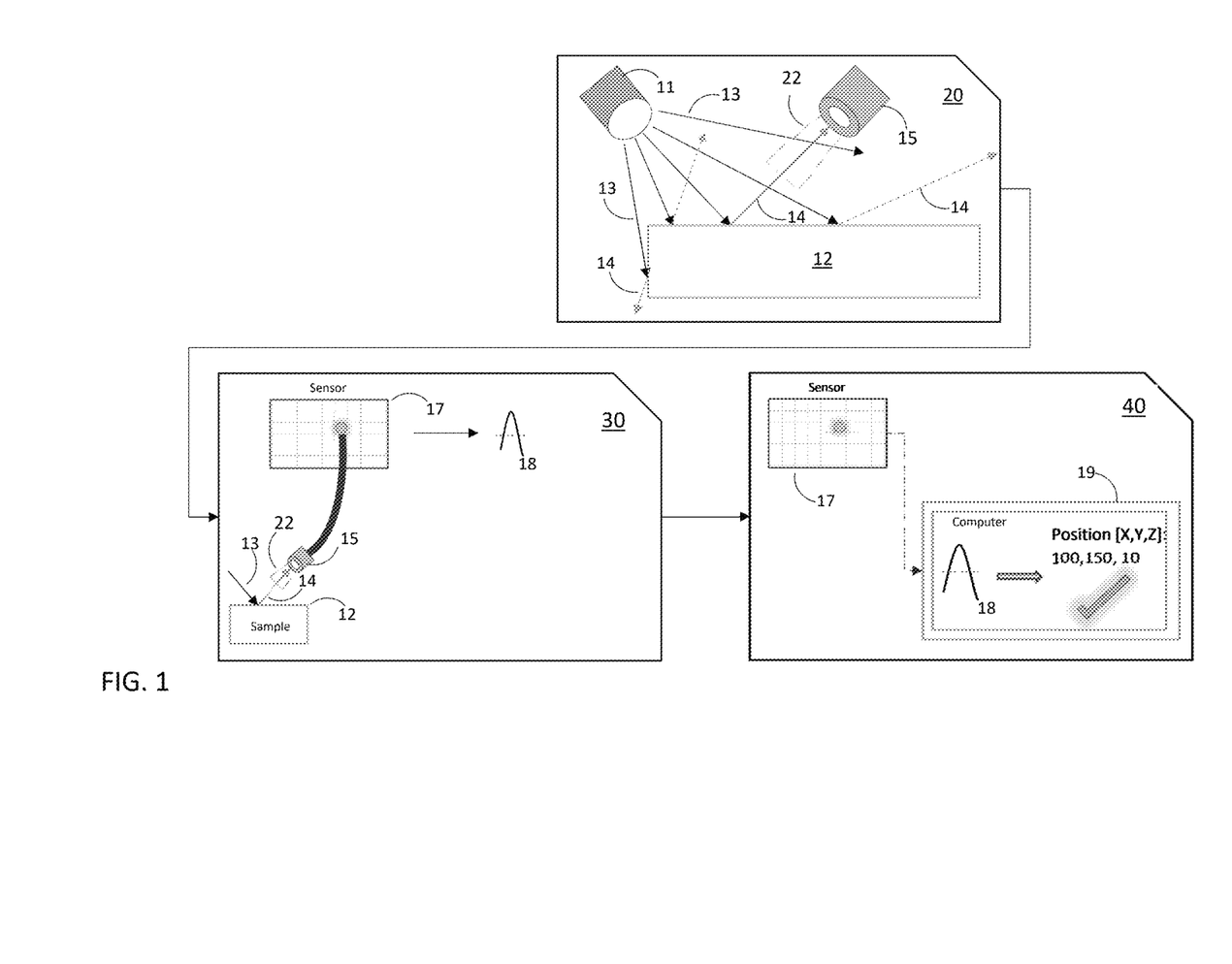
FIG. 1 is a pictorial flow chart depicting image capture steps employed in a fiber optic, three-dimension (3D) imager, according to an embodiment.

Turning now to the figures, FIG. 1 is a pictorial flow chart generally depicting the primary steps employed by the 3D fiber-optic imager according to an embodiment.

Specifically, in step 1, illumination 14 is directed to target 12 and reflected as reflected illumination 13 captured by a collector optic fiber 15 having a known acceptance cone 22 covering a known target area of target 12. In step 2, captured illumination propagates through collector fiber 15 to sensor 17 and translated into an electric signal 18. In step 3, electric signal 18 is directed to a computer 19 for algorithmic construction of a topographical model of the surface of target 12 and outputs the image on a suitable output device like monitor or printer.

Examples of suitable illuminators 11 include light emitting diodes (LEDs) lasers, halogen light, fluorescent light. In certain embodiments, an external illumination is employed.

Examples of suitable collector optic fibers 15 include:

| Mode | Wavelength [nm] | Core [µm] | N.A. |
| --- | --- | --- | --- |
| single | 500-600 | 10-Jan | 0.1-0.14 |
| Multi | 400-550 | 25 | 0.115 |
| Multi | 400-1200 | 105 | 0.22 |

Collector fiber density defines the resolution and in a certain embodiment 20×20 collector fibers are provided to achieve a 500 µm spatial resolution. Resolution enhancement is achieved through algorithmic methods.

In a certain embodiment the illumination and the collector fibers are implemented modularly to facilitate quick removal or replacement of fibers either individually or as units of fiber groups.

In a certain embodiment sensor 17 is implemented as a LED sensor capable of emitting or collecting in accordance with applied voltage, whereas in another embodiment sensor 17 is implemented as a complementary metal-oxide-semiconductor (CMOS), and other sensors providing such functionality.

Figure 7A:
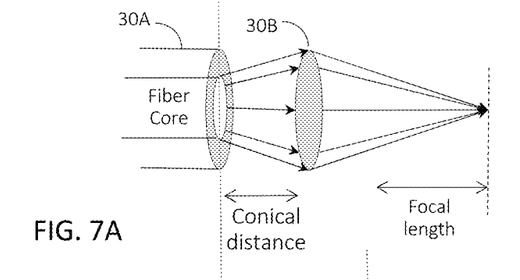
FIGS. 7A and 7B are schematic perspective views depicting the effect of distance between the lens and an optic fiber has a on focal length of a fiber optic unit, according to an embodiment.

An example of suitable 3D image construction algorithms will be discussed in the context of FIG. 7.

Figure 2A:
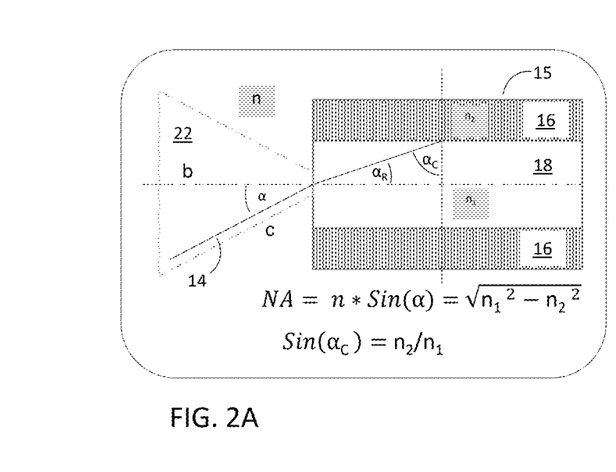
FIGS. 2A-2B are schematic depictions of a collector optic fiber highlighting the effect of the refractive indices of the clad and the core on the numerical aperture defining an acceptance cone for illumination reflecting from a target, according to an embodiment.
Figure 2B:
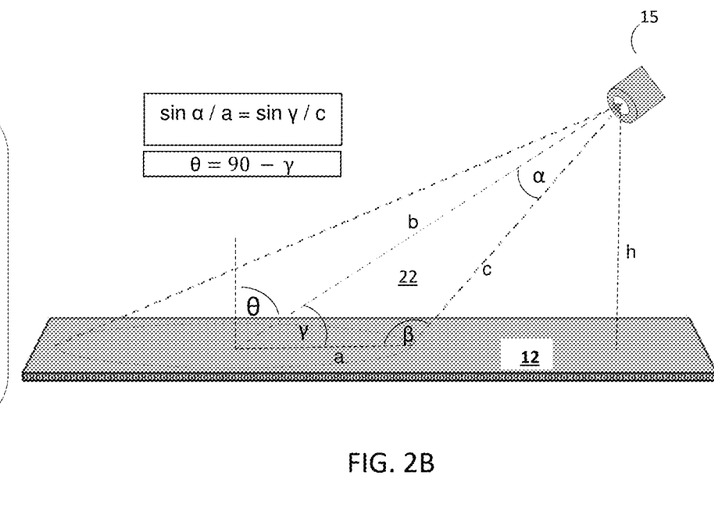

FIGS. 2A-2B are schematic depictions of a collector optic fiber highlighting the effect of the refractive indices of clad 16 and core 18 on the numerical aperture defining an acceptance cone for illumination reflecting from a target.

As shown in FIG. 2A, reflected ray 14 contacts core 18 (not drawn to scale) of collector fiber 15 and is diffracted in accordance with the change in refractive indices of air n and fiber core $n_1$. Complete internal refraction is achieved in accordance with critical angle $\alpha_c$. A cone of acceptance 22 is established in accordance with the numerical aperture NA as shown and having full acceptance angle of $2\alpha$ as is known in the art. FIG. 2B depicts the target area within a given cone of acceptance 22 to advantageously enable calculation of the coordinates of a target area based on the particular collector fiber that captured reflected illumination. Accordingly, an array of collector fibers in which some fibers capture reflected illumination and others do not produces an areal distribution that after rendering into an electronic signal and processing with algorithmic construction methods a corresponding topographical model of the target surface is generated as noted above.

Figure 3:
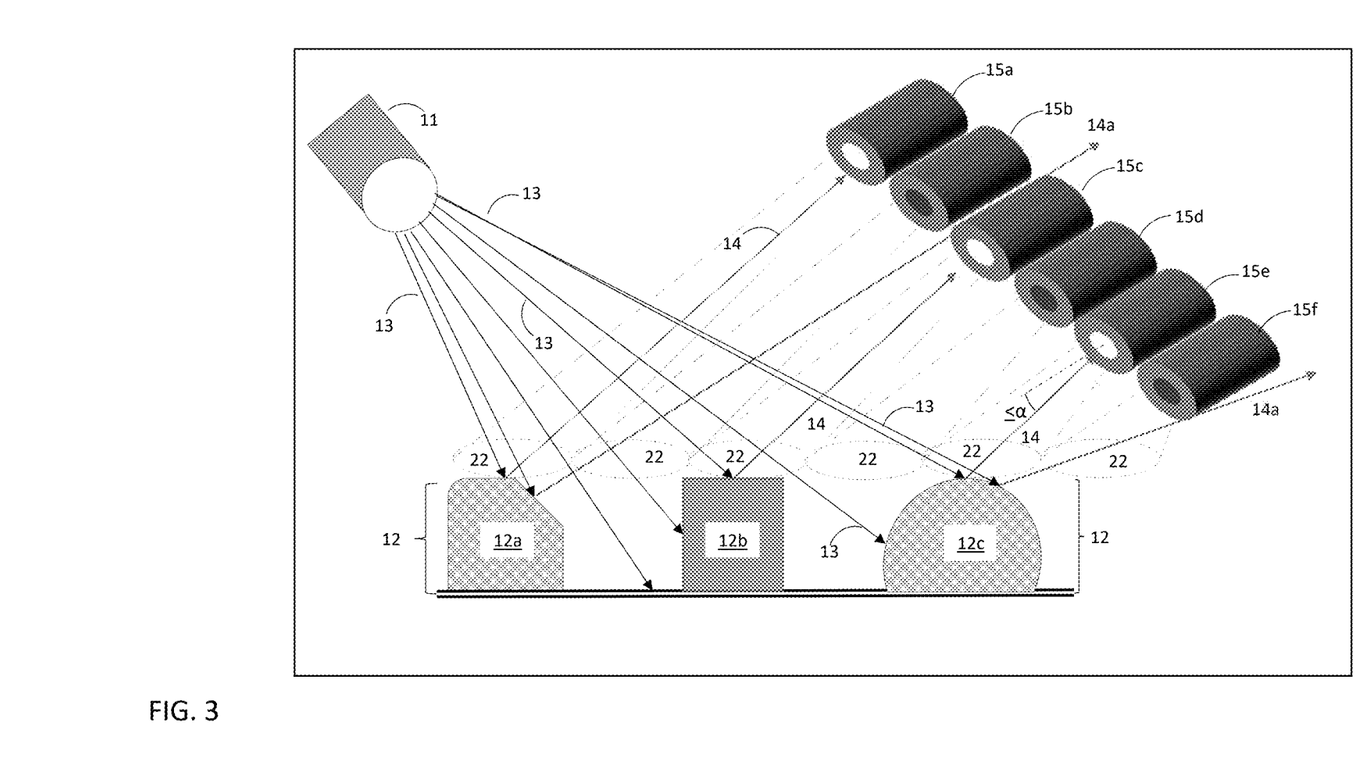
FIG. 3 is a schematic depiction of an image capture scheme highlighting the impact of surface geometry on fiber capture of illumination reflected from a target area, according to an embodiment.

FIG. 3 is a schematic depiction of the effect of target area geometry on image capture, according to an embodiment.

Specifically, depicted is a close-up view of a target 12 having various surface protuberances 12a-12c and acceptance cones 22 of each respective collector optic fiber 15a-15f. When illumination rays 13 from illuminator 11 reflects within an area bound by an acceptance cone at a reflection angle within the range of angles bound by the cone the illumination reflection is captured by the respective collector fiber. For example, a first reflected illumination 14 from protuberance 12a reflects within an area bound by acceptance cone 22 at an angle within cone boundaries (full acceptance angle) is captured by collector 15a whereas a second illumination ray 14a reflects outside of the cone boundaries and therefore is not captured by collector 15a. As shown this reflection ray passes between collectors 15b and 15c. It should be appreciated that this ray will not be accepted by the adjacent collector 15b because the ray reflects at an angle outside the boundaries of acceptance cone 22 of collector 15b. Analogously, illumination reflections 13 are captured by collectors 15c and 15e because they reflect within target areas enclosed by their respective acceptance cone at an angle within the boundaries of the acceptance cone.

Figure 4:
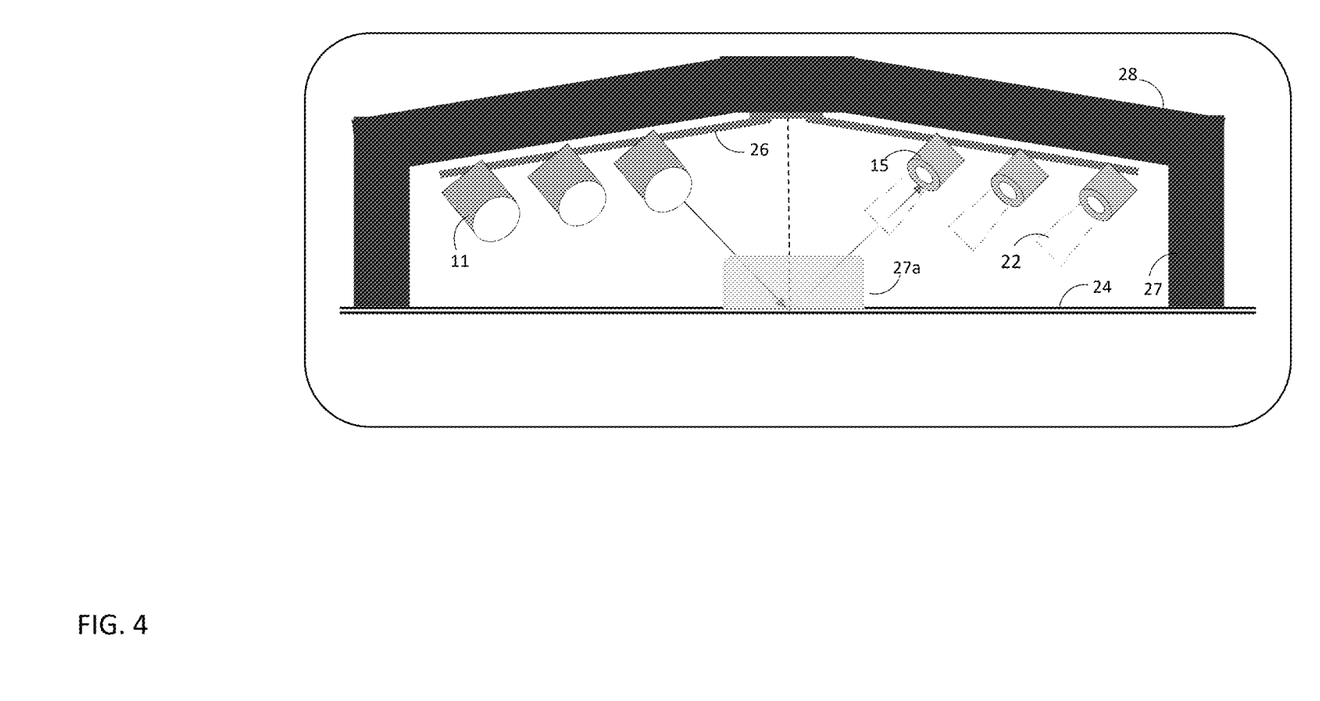
FIG. 4 is a schematic depiction of an fiber-optic imager and spacer housing, according to an embodiment.

This scheme generates a distribution pattern within the array of fiber collectors as shown; collectors 15a, 15c, and 15e capture reflected illumination 14 at an angle less than or equal to a while collectors 15b 15d, and 15f do not capture reflected illumination 14. This distribution pattern corresponds to surface irregularities of the target area 12 and therefore when the image information is processed by a construction algorithm one can construct a topological model. FIG. 4 is a schematic depiction of a fiber-optic imager enclosed in a housing, according to an embodiment.

As shown, illuminators 11 and collector optic fibers 15 are mounted inside housing 28. In a certain embodiment, the housing has a spacer 27 operative to contact target surface 24 to provide a distance between the target surface 24 and collective fibers 15. The known distance is used in image construction calculation.

It should be appreciated that modification of key parameters modifies imager functionality. The distance between collectors 15 defines both spatial and depth resolution. (Their distance is measured from their respective axes.) Whereas the number of collector fibers and their mount angle relative to a vertical normal define lateral coverage and depth of scan. In a certain embodiment the collectors are disposed vertically and in another embodiment the collectors are disposed both on a vertical plane and a horizontal plane.

In a certain embodiment the imager is fitted with a motor configured to change mount angle of the entire collector array.

In a certain embodiment, collector fibers parameters are non-homogeneous in accordance with design requirements. For example, in a certain embodiment, numerical apertures vary from one fiber to the next. In another embodiment, the angles at which the fiber collectors are disposed varies from fiber to fiber. In another embodiment, the core thickness varies from fiber to fiber. In other embodiments, all of these variations are implemented on a row-by-row basis in either the X or Y axis of the collector array.

In a certain embodiment, imaging is implemented on a sub-surface basis by illuminating with wavelengths that have the capacity to penetrate certain materials like target object 27a.

Figure 5:
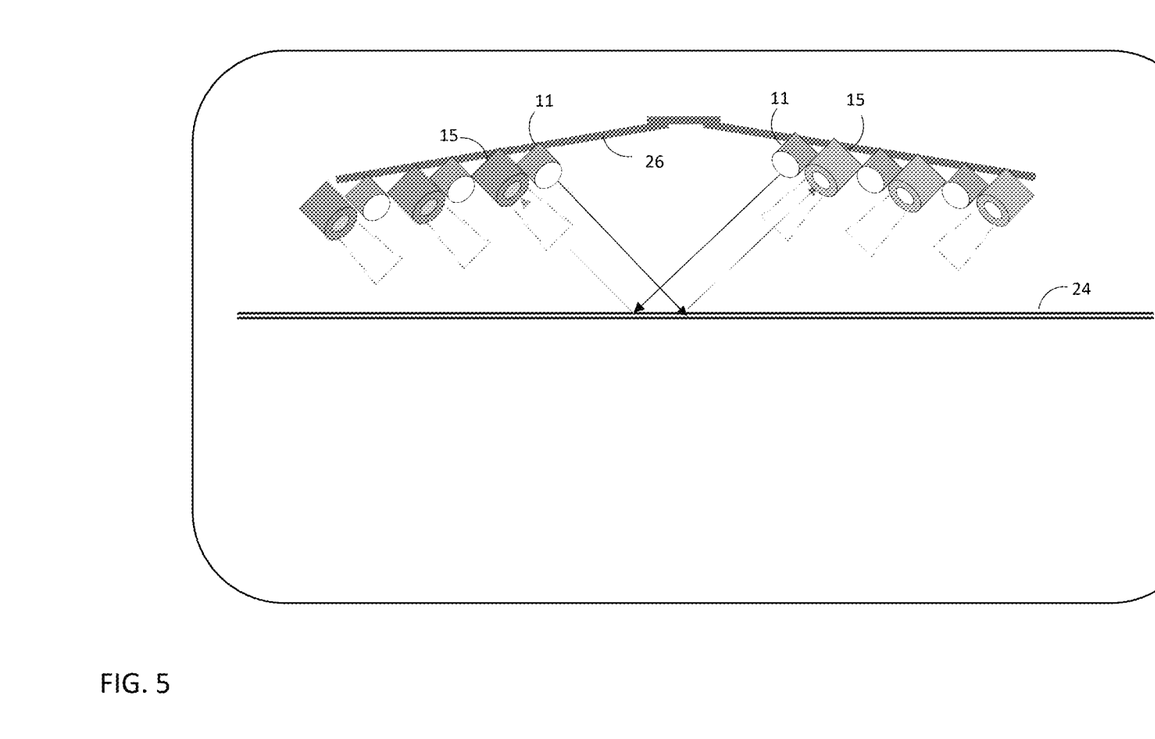
FIG. 5 is a schematic depiction of a fiber-optic imager employing both target illumination and reflection capture from two different planes, according to an embodiment.

FIG. 5 is a schematic depiction of a fiber-optic imager employing both target illumination and reflection capture from two different planes, according to an embodiment.

As shown, both illuminators 11 and collector optic fibers 15 are disposed on opposing planes to enable illumination and illumination capture from both sides of target object 24.

In a variant embodiment, illuminators 11 function also as collectors and collectors 15 also function as illuminators. This scheme is implemented by implementing the illuminators and the collectors as LED sensors configured to alternatively illuminate and collect synchronously. During illumination of a first array of LED sensors, the second array is functioning in the collecting mode. Conversely, when the LEDs of the second array are actuated as illuminators, the first array is actuated as collectors.

This scheme advantageously enables each viewing area to be viewed from two viewing able thereby adding image construction accuracy.

Figure 6:
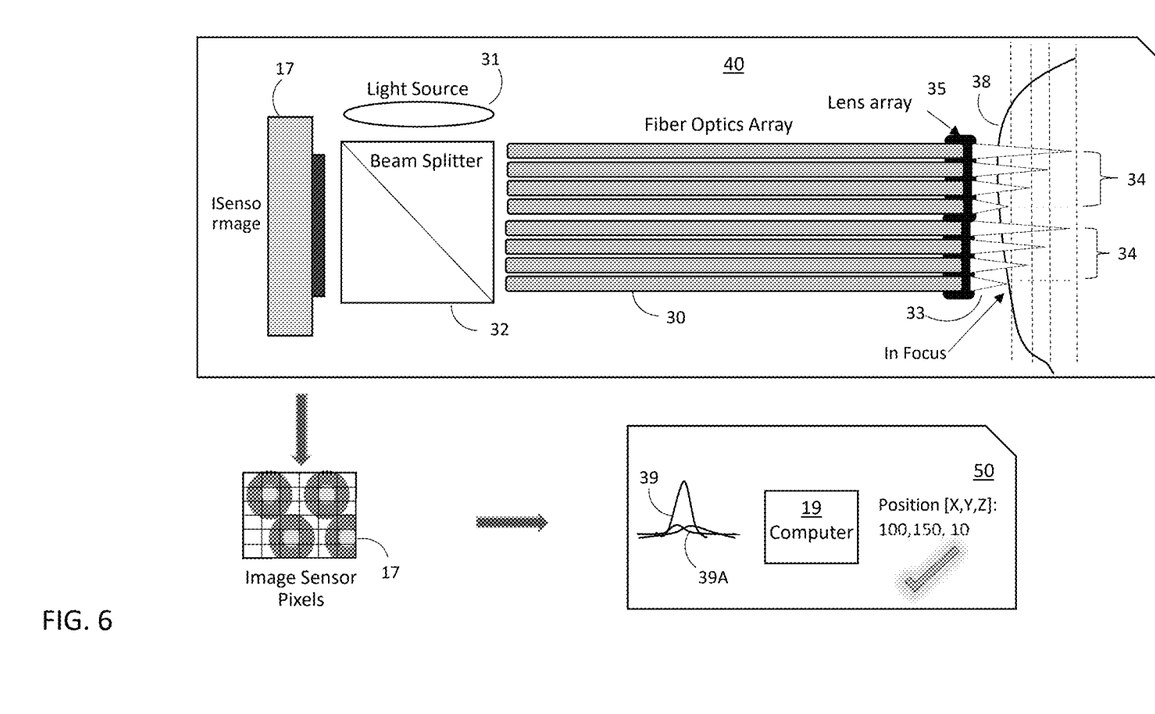
FIG. 6 is a pictorial flow chart of a fiber-optic imager employing focal length as a discriminatory feature, according to an embodiment.

FIG. 6 is a pictorial flow chart of a fiber optic imager employing focal length as a discriminatory feature, according to an embodiment. The fiber optic imager is constructed from one or more arrays, also referred to as bundles, of fiber optic units. The fiber optic unit includes an optic fiber, a lens, a light or illumination sensor. In certain embodiments the fiber optic unit also includes an illuminator.

As shown, in step 40 an illumination source 31 directs light to a beam splitter 32 enabling usage of the same fibers for both illumination and reflected data collection. The splitter 32 splits the beam and directs a portion of the light through optic fibers of a fiber optic bundle 30. The light is then focused onto a target 38 with a micro lens array 35 of lens of different focal lengths 34. The depth of scan range and resolution is set by the different focal length of each lens. When illumination is focused on target 38, light is reflected with a focal intensity through its respective microlens and returns through the corresponding fiber to beam splitter 32. Illumination reflected from target 38 not disposed at a focal length is also reflected, however, it is reflected at an intensity less than the focal intensity. All captured reflected illumination returns through the fibers to beam splitter 32 where a portion of the light is directed onto sensor 17. In step 50, sensor 17 generates dominant signals 39 and non-dominant signals 39A corresponding to the high intensity signal and the low intensity signals. A distribution of captured illuminations of focal intensity and less than focal intensity is rendered into an image in computer 19 with image construction algorithms to produce a topological model and outputs the model to an output device.

Figure 7B:
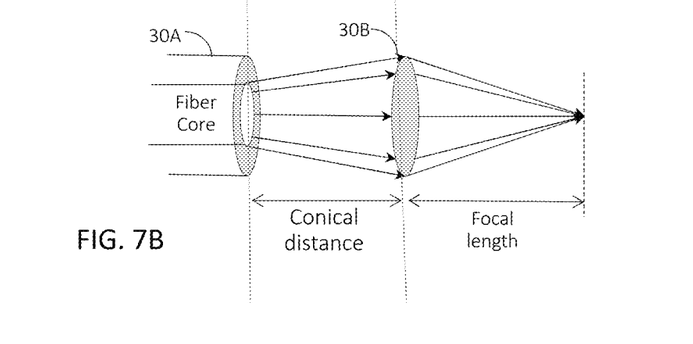

FIGS. 7A and 7B are schematic perspective views depicting the effect of distance between the lens and an optic fiber has a on focal length of a fiber optic unit.

As shown, the conical distance between fiber 30A and lens 30B defines the focal length. Accordingly, the greater conical distance of FIG. 7B creates a greater focal length for identical lenses 30B. Accordingly, during manufacture, lenses are fixed to the fibers at the distance providing the desired focal length appropriate for a n intended application.

Alternatively, the focal length can be set by simply selecting lenses with different in different powers while fixing each of to its respective optic fiber at an identical conical distance.

FIGS. 8A-8D are schematic perspective views depicting reflection intensity as a function of position of a reflecting surface relative to a focal length.

Figure 8A:
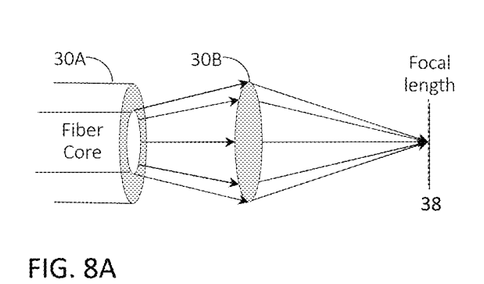
FIGS. 8A-8D are schematic perspective views depicting reflection intensity as a function of position of a reflecting surface relative to a focal length, according to an embodiment.
Figure 8B:
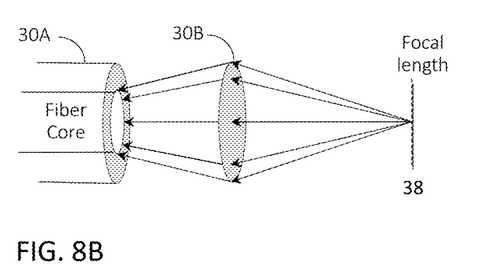

FIG. 8A depicts illumination on a target surface 38 disposed at the focal length of lens 30B. Rays emanate from the fiber core of fiber 30A, diverge to lens 30B and converge to lens focal length on target sample 38. The convergence to a focal point on sample creates a focal intensity that is substantially preserved when reflected back to lens 30B and converge back into the fiber core of fiber 30A as shown in FIG. 8B. Such convergence generates a strong sensor signal that is used a s a discriminatory signal indicative of the presence of a target surface as previously noted.

Figure 8C:
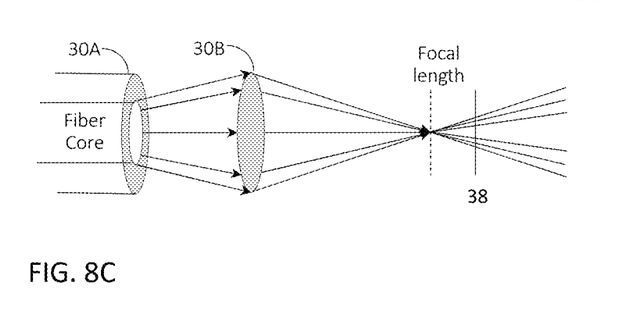
Figure 8D:
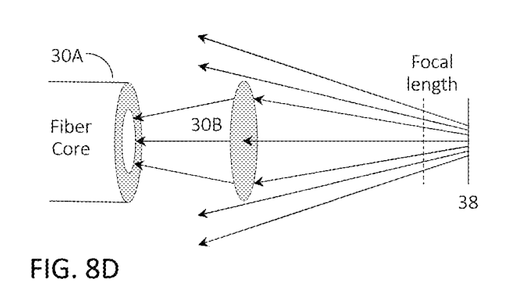

In contrast, FIG. 8C depicts illumination on a target surface 38 disposed at a non-focal length of lens 30B. Rays emanate from the fiber core of fiber 30A, diverge to lens 30B and converge to lens focal length before the target sample 38. The rays continue and diverge after their focal point and are incident on target surface 39 with diminished intensity. The divergent rays reflect to lens 30B and the few incident rays converge back to the fiber core of fiber 30A with a greatly diminished intensity as shown in FIG. 8D. Their greatly diminished intensity generates a weak sensor signal as noted above.

Figure 9A:
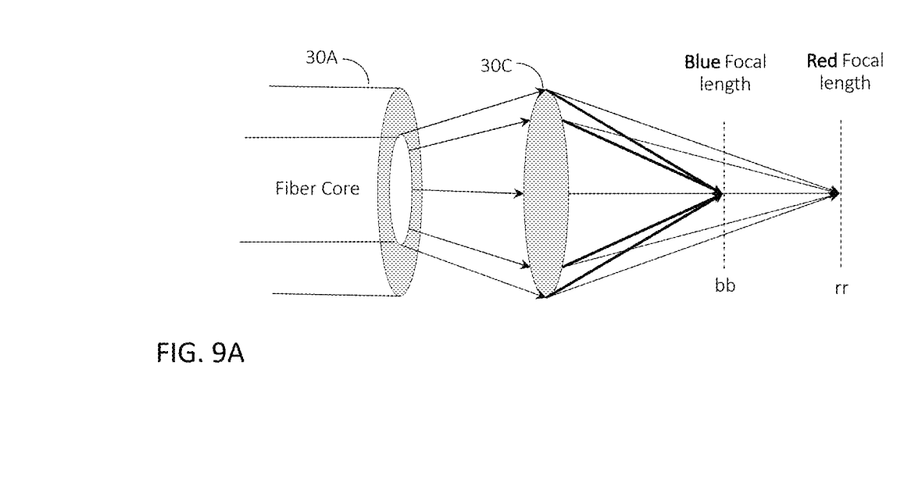
FIG. 9A is a schematic view depicting the effect of chromatic aberration of lens 30C on focal length according to an embodiment.

FIG. 9A is a schematic view depicting the effect of chromatic aberration of lens 30C on focal length. As shown, chromatic aberration causes the focal length to change a function of emission wavelength. As shown, white light emanating from fiber 30A is directed to lens 30C and its chromatic aberration has a shorter focal length for blue wavelengths and a longer focal length for red wavelengths, for example. The different focal lengths can be used resolve depth of a target surface as will be explained.

Figure 9B:
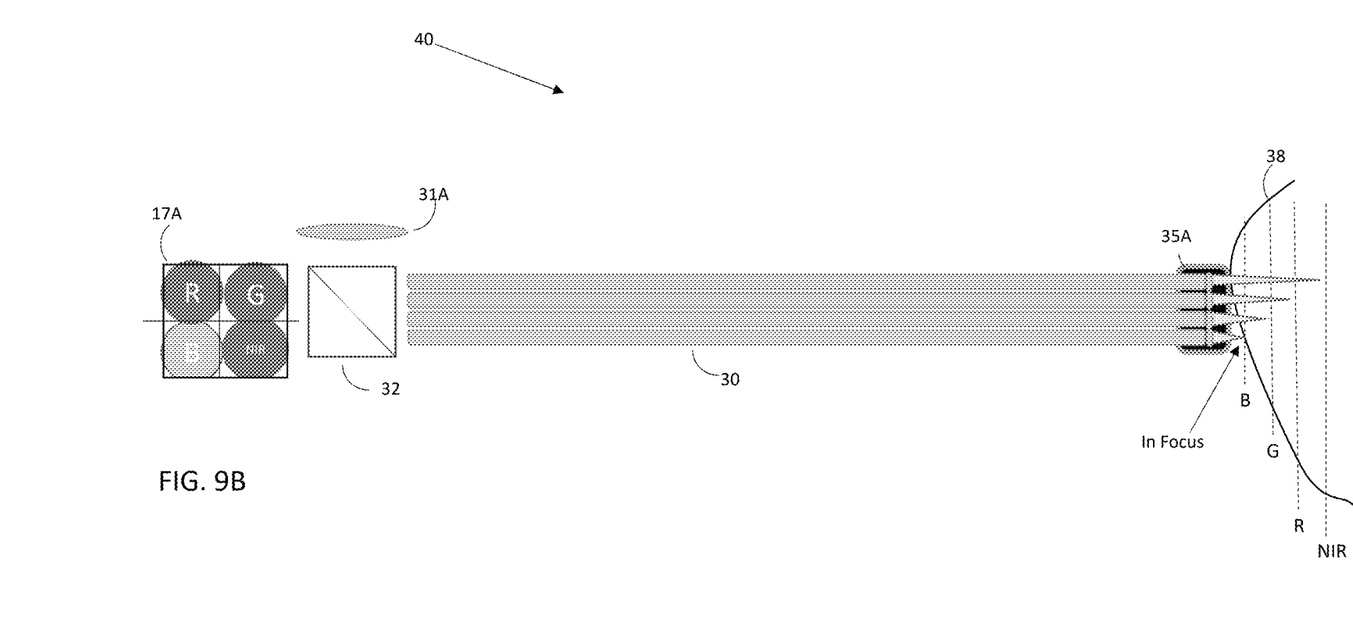
FIG. 9B depicts a variant embodiment of the fiber optic imager depicted in FIG. 6.

FIG. 9B depicts a variant embodiment of the fiber optic imager depicted in FIG. 6.

Imager 40 includes a filtered light sensor 17A, a white light source 31A, a beam splitter 32, and array of fiber optics 30, a lens array 35A of same power lenses having a chromatic aberration. Sensor processing is implemented in the manner described in the context of FIG. 6.

As shown, each lens of lens array 35A has differing focal lengths as a function of wavelength. Focal lengths for blue (B), green (G), red (R), and near infrared (NIR). Only the focal point of the blue wavelength falls on the target surface 38. Accordingly, the intensity of the light propagated to beam splitter 32 is greater than the intensity of the signal transmitted by the fibers having lens of focal lengths not focused on target surface 38. Filtered sensor 17A is a filtered sensor response to either green, blue, red, or near infrared wavelengths all in according to the applied filtering, like that found in a Bayer mask (spectral filter) for example.

In one embodiment filtered sensor 17A has the capacity to respond to only one wavelength. In another embodiment, filtered sensor 17A has the capacity to respond to one of two possible wavelengths, whereas in another embodiment filtered sensor 17A has the capacity to respond to one of four possible wavelengths. Filtered sensor 17A always has the capacity to respond to one wavelength because there is only a single point in space for which the target surface an reflect the illumination at substantially full intensity.

Lens 30C must disperse a set of different focal lengths for wavelengths that match the Bayer filter colors. In a certain embodiment, fibers are linked to one masked sensor pixel of sensor 17A, in another embodiment each fiber is linked to two masked sensor pixels, in another embodiment each fiber is linked to masked sensor pixels. In all cases, high sensor responsiveness in a certain masked sensors pixel, means that the object is at the focal distance of the wavelength for which there was high responsiveness. Such functionality advantageously provides scan depth and resolution in accordance with the distance between each wavelength focal length and the deployment of the Bayer mask on the sensor.

In another embodiment employing wavelength to define lens focal length, different color illumination is employed. Here too, each color has a different focal length and therefore can be used to identify a target surface based on the intensity level of the reflection received by the sensor. However, the sensor in the embodiment is unmasked and has a responsiveness in the visible light range, according to and embodiment.

An illustrative example of operation is to switch illumination wavelength at a certain sequence between ~480 nm (blue), ~530 nm (green), ~680 nm (red) & ~850 nm (Near IR), for a fiber having total internal reflection of these wavelengths, a sensor with quantum efficiency responsive at these wavelengths, and a lenses that disperse the set of four different wavelengths to four different focal lengths that match these wavelengths. This advantageously provides a certain scan depth & resolution according to the distance between each wavelength focal length.

Figure 10:
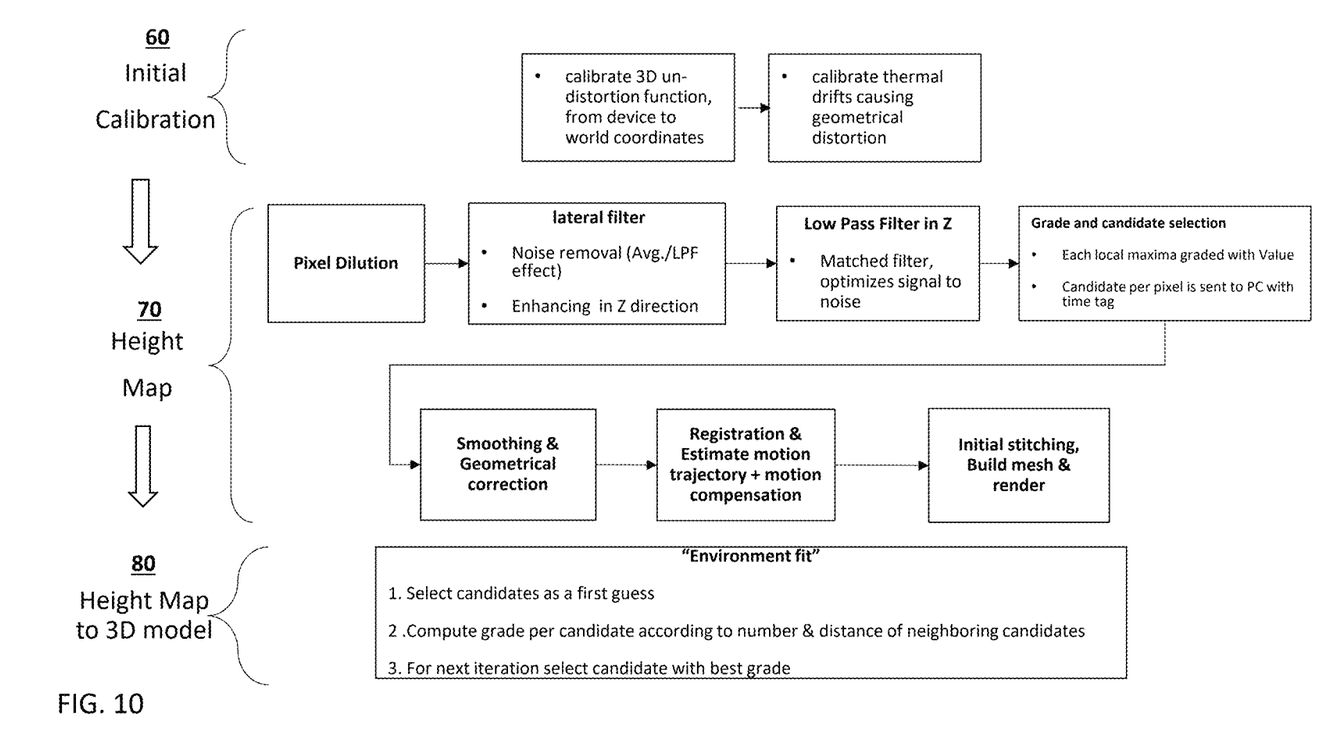
FIG. 10 is a high-level flow chart of the processing steps in a 3D image construction algorithm, according to an embodiment.

FIG. 10 is an example of a high-level flow chart of the processing steps in a 3D image construction algorithm. As shown, initial calibration is implemented in the processing steps of Calibration Stage 60. Areal depth determination is implemented in the processing steps of Height Map Stage 70. Registration of height maps to create a final mesh is implemented in the processing steps of Height Map To 3D Model Stage 80.

It should be appreciated that embodiments formed from combinations of features set forth in separate embodiments are also within the scope of the present invention.

While certain features of the invention have been illustrated and described herein, modifications, substitutions, and equivalents are included within the scope of the invention.

What is claimed is:

1. A fiber-optic, depth imager for imaging a target surface, the imager comprising:
a collector array having two or more fiber optic units, each of the fiber optic units having an optic fiber and a lens,
each of the two or more fiber optic units operative to provide a different focal point on a target surface, each of the two or more fibers optic units configured to selectively receive a reflected illumination of focal intensity from the target surface disposed at its respective focal point so as to achieve depth resolution of the target surface,
the depth resolution manifest in the array as a distribution of fibers optic units capturing illumination of focal intensity reflected from the target surface and fiber optic units capturing illumination less than focal intensity reflected from the target surface, the distribution corresponding to a collective surface geometry of the target surface, wherein the lens of each of the two or more fiber optic units has a different chromatic aberration.

2. The imager of claim 1, wherein the each of the two or more fiber optic units having an optic fiber and a lens is implemented with the lens disposed at a conical distance from the fiber.

3. The imager of claim 2, wherein an optical power of the lens of each of the two or more fiber optic units is different.

4. The imager of claim 2, wherein the conical distance of the two or more fiber optic units is different.

5. The imager of claim 1, wherein each of the two or more fiber optic units include a filtered light sensor responsive to a light wavelength having a focal point on the target surface.

6. The imager of claim 1, wherein each of the two or more fiber optic units are further used for illumination.

7. The imager of claim 6, wherein each of the two or more fiber optic units are in communication with an illumination source of different wavelengths.

8. The imager of claim 1, wherein the different focal point is not provided by employing wavelength.

9. The imager of claim 1, wherein the different focal point is not defined in accordance with chromatic lens aberration.

* * * * *